United States Patent
Oz et al.

(10) Patent No.: US 7,099,287 B1
(45) Date of Patent: Aug. 29, 2006

(54) NODE DETECTION AND RING CONFIGURATION FOR PHYSICAL STAR CONNECTED NETWORKS

(75) Inventors: Doron Oz, Even Yehuda (IL); Eldad Bar-Eli, Ramat Hasharon (IL); Moti Haimovsky, Modi'in (IL)

(73) Assignee: Cisco Systems O.I.A. (1988) Ltd., Herzelia (IL)

( * ) Notice: Subject to any disclaimer, the term of this patent is extended or adjusted under 35 U.S.C. 154(b) by 868 days.

(21) Appl. No.: 09/799,755

(22) Filed: Mar. 6, 2001

(51) Int. Cl.
*H04L 12/28* (2006.01)

(52) U.S. Cl. .................... 370/258; 370/434
(58) Field of Classification Search ............... 370/258, 370/434
See application file for complete search history.

(56) References Cited

U.S. PATENT DOCUMENTS

| | | | |
|---|---|---|---|
| 5,084,870 A * | 1/1992 | Hutchison et al. | 370/258 |
| 5,523,998 A * | 6/1996 | Patrick et al. | 370/465 |
| 2001/0033550 A1* | 10/2001 | Banwell et al. | 370/254 |
| 2002/0009048 A1* | 1/2002 | Hosler et al. | 370/217 |

OTHER PUBLICATIONS

ONS 15190 INstallation and Configuration Guide, Chapters 1, 5, and Appendix A, Cisco Systems Inc. (Sep. 2000).*
ONS 15190 Installation and Configuration Guide, Chapter 5, Cisco Systems, Inc., p. 5-3, (Sep. 2000).
SDH Telecommunications Standard Primer, Teletronix, Inc., p. 9, (2000).
SONET Telecommunications Standard Primer, Teletroniz, Inc., p. 9, (1997).
Goralski, W., SONET: A Guide to Synchronous Optical Network, Chapter 5: SONET Architecture and Protocols, W. Goralski, Ed., McGraw-Hill, NY, p. 147, (1997).

* cited by examiner

*Primary Examiner*—Huy D. Vu
*Assistant Examiner*—Jason Mattis
(74) *Attorney, Agent, or Firm*—Schwegman, Lundberg, Woessner & Kluth P.A.

(57) ABSTRACT

A novel and useful mechanism for detecting the nodes connected to a network device and for creating a ring network from the nodes detected thereby. The invention simplifies insertion, removal and modification of nodes in the ring by detecting and reconfiguring the ring without requiring intervention by a user. Identification information messages generated by network devices and sent out on all links and received over a plurality of ports are used in identifying and determining the connectivity and topology of the network devices. The resulting topology information is stored in a node database. The contents of the node database are then used to generate one or more ring networks, wherein each ring generated corresponds to a unique line speed. The connectivity of the one or more rings generated is stored in a ring database and the rings configured therefrom.

40 Claims, 6 Drawing Sheets

NODE DETECTION AND RING CONFIGURATION FOR PHYSICAL STAR CONNECTED NETWORKS

FIELD OF THE INVENTION

The present invention relates generally to data communication systems and more particularly relates to an apparatus for and a method of detecting the connectivity of nodes connected to a network device and the automatic configuration of one or more ring networks therefrom.

BACKGROUND OF THE INVENTION

The world is currently witnessing explosive growth in the demand for communications networks and systems and it is predicted that this demand will increase in the future. The demand for data services is growing at an ever increasing rate. Meeting these demands requires communication networks having higher bandwidth capabilities. In an effort to meet this demand, carriers must install facilities that are capable of carrying increasing amounts of data traffic. Manufacturers of network equipment attempt to keep up with the demand by developing equipment that can handle higher bandwidths.

In addition, much of the new bandwidth capacity being installed nowadays by carriers includes optical fiber networks. In particular, optical networks based on the SONET and SDH standards are commonly being installed. SONET/SDH optical networks are often configured to operate as ring structures since these types of networks exhibit improved performance.

A block diagram illustrating an example ring network is shown in FIG. 1. The ring network, generally reference 10, comprises a plurality of network devices 12 wherein each device or node is connected to its two neighbors via optical links 14. In the example shown herein, the ring network comprises four nodes labeled node A through node D. Each link comprises a bi-directional communications link. Note that an additional link may be used to connect each node thus creating a second inner ring. In this case, each ring handles traffic in a single direction, i.e. clockwise traffic and counterclockwise traffic.

The creation of large ring networks containing ten or more nodes is difficult since connections must be made to neighbors in either side of a node. Once a ring network is established and configured, insertion and deletion of nodes typically becomes very problematic. To insert or delete a node, the ring must be broken and new connections established to maintain the integrity of the ring.

One solution to this problem is to use a concentrator that is basically a network switching device whereby all the network devices (i.e. nodes) are connected in a physical star configuration to the concentrator. The concentrator emulates a ring structure internally by forwarding data from node to node around the ring via internal connections through the switch.

Although the use of a concentrator serves to simplify the physical cabling and connectivity needed to establish a ring network, the problem of configuring the internal connections in the concentrator remains. One approach is to have all internal routing configurations performed manually by the user. This approach permits the connection of nodes in any desired order but requires exact knowledge of the external connections, i.e. identification of ports, network devices and connections. Further, there is no detection of faulty wiring, connections or illegal routing. Any changes made later on, such as node addition, deletion and reordering, require the user to re-configure all the internal routing.

Another approach is to provide default routing whereby the internal routing is set to a default configuration. The external connections are then made so as to result in a logical ring. This method, however, does not permit any flexibility in reconfiguring the system and does not provide any fault wiring detection or prevention.

Thus, there is a need for a mechanism that can automatically detect and identify the nodes connected to the concentrator. Such a mechanism would be able to detect the insertion, deletion and modification of nodes attached to the concentrator. In addition, it is desirable to be able to automatically configure a ring network comprising the detected nodes.

SUMMARY OF THE INVENTION

The present invention is a novel mechanism for detecting the nodes connected to a network device and for creating a ring network from the nodes detected thereby. The present invention has application in any type of ring network environment where the nodes are connected to a centralized network concentrator in a physical star configuration. The invention is particularly useful in SONET/SDH optical based ring networks wherein the nodes are connected to a concentrator in physical star configuration. The invention simplifies insertion, removal and modification of nodes in the ring by detecting and reconfiguring the ring with minimal user intervention.

The invention utilizes identification information messages generated by network devices and sent out on all its links. These messages are received over the ports on the concentrator or other device embodying the invention, and the identification, connectivity and topology of the network devices is determined therefrom and stored in a node database. The contents of the node database are then used to generate one or more ring networks, wherein each ring generated comprises the set of nodes that may be connected to each other. The connectivity of the one or more rings generated is stored in a ring database and the rings configured therefrom. The connectivity of the rings may be optionally displayed for approval by a user before actual configuration.

There is thus provided in accordance with the present invention a method of detecting a plurality of network devices connected to a concentrator having a plurality of ports, the comprising the steps of establishing a node database adapted to store node information representing the connectivity of network devices connected to the concentrator, receiving identification information on each port connected to a network device, matching valid pairs of ports wherein each valid port pair represents a detected node, verifying that each detected node comprises an A interface and a B interface connection and adding new detected nodes to the node database.

There is also provided in accordance with the present invention a method of detecting and connecting in ring fashion a plurality of network devices connected to a concentrator having a plurality of ports, the comprising the steps of establishing a node database adapted to store node information representing the connectivity of network devices connected to the concentrator, establishing a ring database adapted to store ring information representing the configuration of one or more rings, receiving identification information on each port connected to a network device, matching valid pairs of ports wherein each valid port pair represents a detected node, verifying that each detected node comprises an A interface and a B interface connection, adding new detected nodes to the node database, connecting the B interface of each node in the node database to the A interface of a node subsequent thereto in the node database and connecting the A interface of a first node in the node database to the B interface of a last node in the node database thus forming a ring.

There is further provided in accordance with the present invention a concentrator for detecting and connecting in ring fashion a plurality of network devices connected thereto comprising a plurality of line interface cards, each having a plurality of ports for connection to the network devices, a node database adapted to store node information representing the connectivity of network devices connected to the concentrator, a ring database adapted to store ring information representing the configuration of one or more rings, a node detector operative to receive identification information on each port connected to a network device, match valid pairs of ports wherein each valid port pair represents a detected node, verify that each detected node comprises an A interface and a B interface connection, add new detected nodes to the node database, a ring generator operative to connect the B interface of each node in the node database to the A interface of a node subsequent thereto in the node database, connect the A interface of a first node in the node database to the B interface of a last node in the node database thus forming a ring and a switch operative to forward data from one node to another in accordance with the configuration of the ring.

There is also provided in accordance with the present invention a computer readable storage medium having a computer program embodied thereon for causing a suitably programmed system to detect and connect in ring fashion a plurality of network devices connected to a concentrator having a plurality of ports by performing the following steps when such program is executed on the system (1) establishing and maintaining a node database adapted to store node information representing the connectivity of network devices connected to the concentrator, (2) establishing and maintaining a ring database adapted to store ring information representing the configuration of one or more rings, (3) receiving identification information on each port connected to a network device, (4) matching valid pairs of ports wherein each valid port pair represents a detected node, (5) verifying that each detected node comprises an A interface and a B interface connection, (6) adding new detected nodes to the node database, (7) connecting the B interface of each node in the node database to the A interface of a node subsequent thereto in the node database and (8) connecting the A interface of a first node in the node database to the B interface of a last node in the node database thus forming a ring.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASCII | American National Standard Code for Information Interchange |
| ASIC | Application Specific Integrated Circuit |
| CPU | Central Processing Unit |
| CRT | Cathode Ray Tube |
| DSP | Digital Signal Processor |
| EEPROM | Electrically Erasable Programmable Read Only Memory |
| EEROM | Electrically Erasable Read Only Memory |
| EPROM | Electrically Programmable Read Only Memory |
| FPGA | Field Programmable Gate Array |
| IP | Internet Protocol |
| LAN | Local Area Network |
| LCD | Liquid Crystal Display |
| NIC | Network Interface Card |
| OC | Optical Carrier |
| PBX | Private Branch Exchange |
| POH | Path Overhead |
| PTE | Path Terminating Equipment |
| PTM | Path Trace Message |
| RAM | Random Access Memory |
| ROM | Read Only Memory |
| SDH | Synchronous Digital Hierarchy |
| SNMP | Simple Network Management Protocol |
| SONET | Synchronous Optical Network |
| SPE | Synchronous Payload Envelope |
| TCP | Transmission Control Protocol |

Detailed Description of the Invention

The present invention is a mechanism for detecting the nodes connected to a network device and for creating a ring network from the nodes detected. The present invention has application in any type of ring network environment where the nodes are connected to a centralized network concentrator in a physical star configuration. The invention is particularly useful in SONET/SDH optical based ring networks wherein the nodes are connected to a concentrator in physical star configuration. The invention simplifies insertion, removal and modification of nodes in the ring by detecting and reconfiguring the ring with minimal user intervention.

For illustration purposes, the invention is described in the context of an example ring network. Note, however, that it is not intended that the invention be limited to the examples presented herein. It is appreciated that one skilled in the art can apply the principles of the invention to other systems as well.

For purposes of this specification, the term 'network device' shall be taken to mean any physical device within a network used for the purposes of communications such as within a ring network, including but not limited to, a switch, router, hub, exchange, bridge, concentrator, workstation or terminal using any suitable protocol such as Ethernet, SONET, SDH, Token Ring, TCP, IP, etc. Note that a network device may be implemented in either software, hardware or a combination of both. The term 'node' shall be taken to mean a pair of network entities having matching names and IP addresses (such as two interfaces of a router utilized to connect to a single ring).

Figure 1:
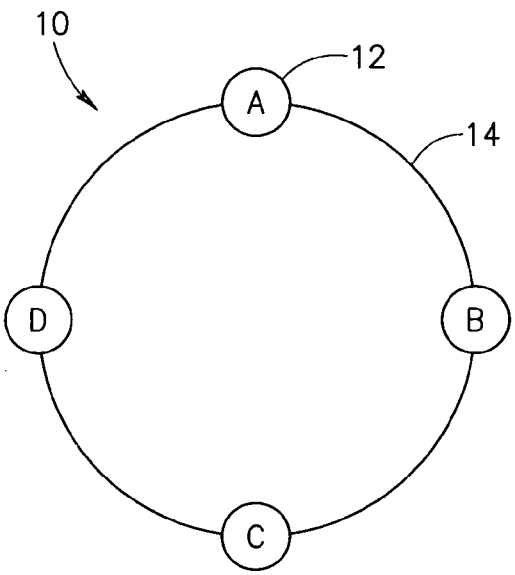
FIG. 1 is a block diagram illustrating an example ring network.
Figure 2:
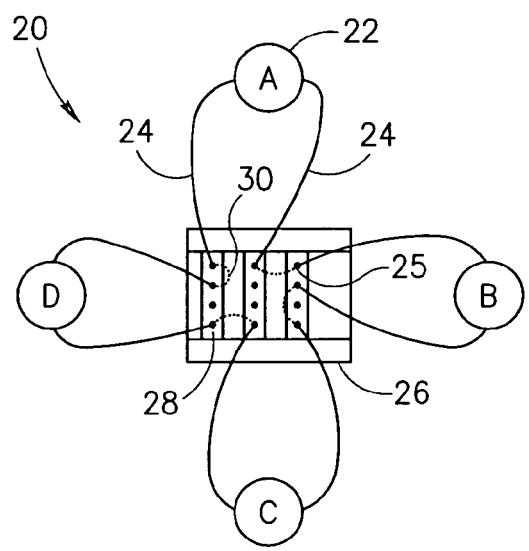
FIG. 2 is a block diagram illustrating a plurality of network devices connected in a physical star to a concentrator adapted to emulate a ring network.

A block diagram illustrating a plurality of network devices connected in a physical star to a concentrator adapted to emulate a ring network is shown in FIG. 2. The ring network, generally referenced 20, comprises a plurality of nodes 22 coupled to concentrator 26 via links 24 (each link representing a bi-directional link). The network switching device/concentrator comprises a plurality of line interface cards 28 each having a plurality of ports 25. Each node is connected to the concentrator via two links, each connected to a different physical port. In this example ring network, four nodes are shown, labeled node A through node D. It is appreciated that ring networks of any size may be constructed depending on the implementation.

Each side of the links 24 is identified with unique Ids termed side IDs: either interface A or interface B. Connections to the same side ID are not legal. In other words, an A interface must be connected to a B interface and vice versa.

The concentrator is adapted to emulate a ring structure internally even though the nodes are connected in a physical star configuration. The concentrator performs this function using switching means adapted to forward data from node to node around the ring. Via the switching functions, the concentrator effectively establishes internal connections between the nodes as shown by the dotted connections 30 between ports.

The node detection method of the present invention utilizes identification information that is sent between devices on the network. For example, in SONET/SDH compatible networking equipment manufactured by Cisco Systems Inc., San Jose, Calif., identification information is exchanged via Path Trace Messages (PTMs). Each node on the ring transmits a distinctive PTM based on data unique to the node. This information is used by the present invention to detect the nodes connected to the concentrator.

In accordance with the present invention, the identification information can be generated and transmitted using any suitable technique. An example technique is shown suitable for use with SONET/SDH networks. In addition, to user data, the SONET and SDH frames comprise Path Overhead (POH) bytes. In particular, the J1 Path Trace byte is used to transport the identification information generated by the network device. According to the SONET standard, this user programmable field may repetitively transmit a 64 byte fixed length string that enables the receiving path terminating equipment (PTE) to verify its connection to the device sending the synchronous payload envelope (SPE).

Figure 3:
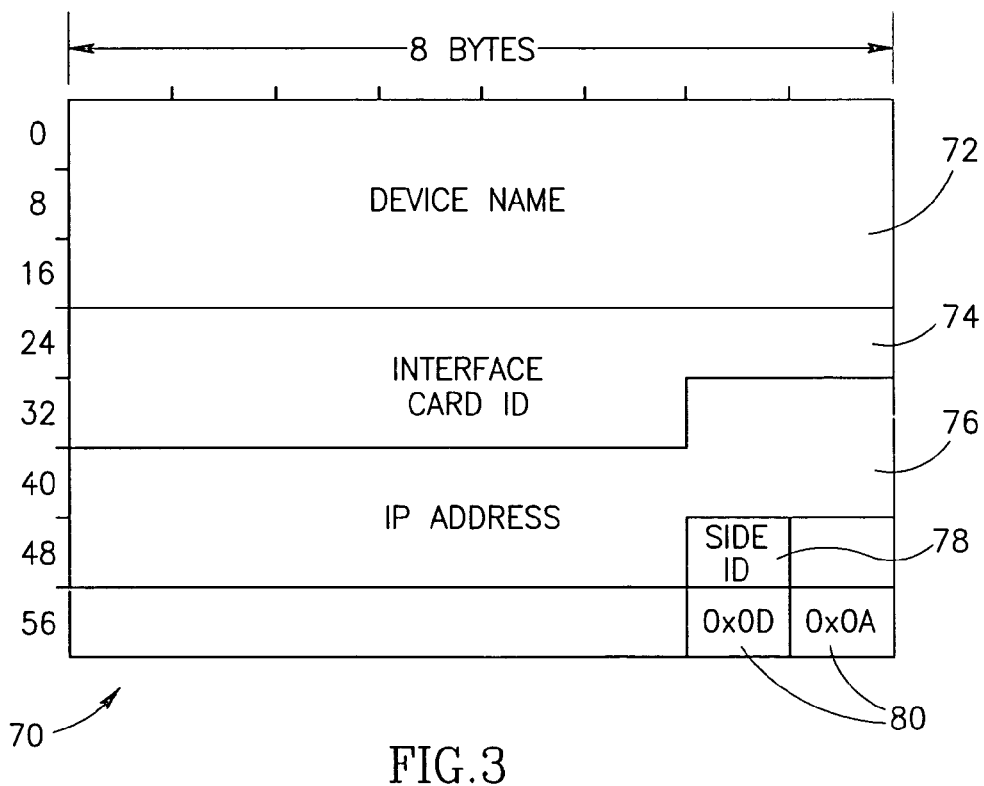
FIG. 3 is a diagram illustrating an example identification information message sent by each network device.

A diagram illustrating an example identification information message sent by each network device is shown in FIG. 3. This 64 byte ASCII encoded message, generally referenced 70, is sent using the POH bytes transmitted via the J1 path trace bytes. The fields comprise a 24 byte device name field 72, 14 byte interface card ID field 74, 16 byte IP address field 76, side ID field 78 which may take values of either A or B and sync bytes 80 which are set at 0x0D and 0x0A.

Figure 4:
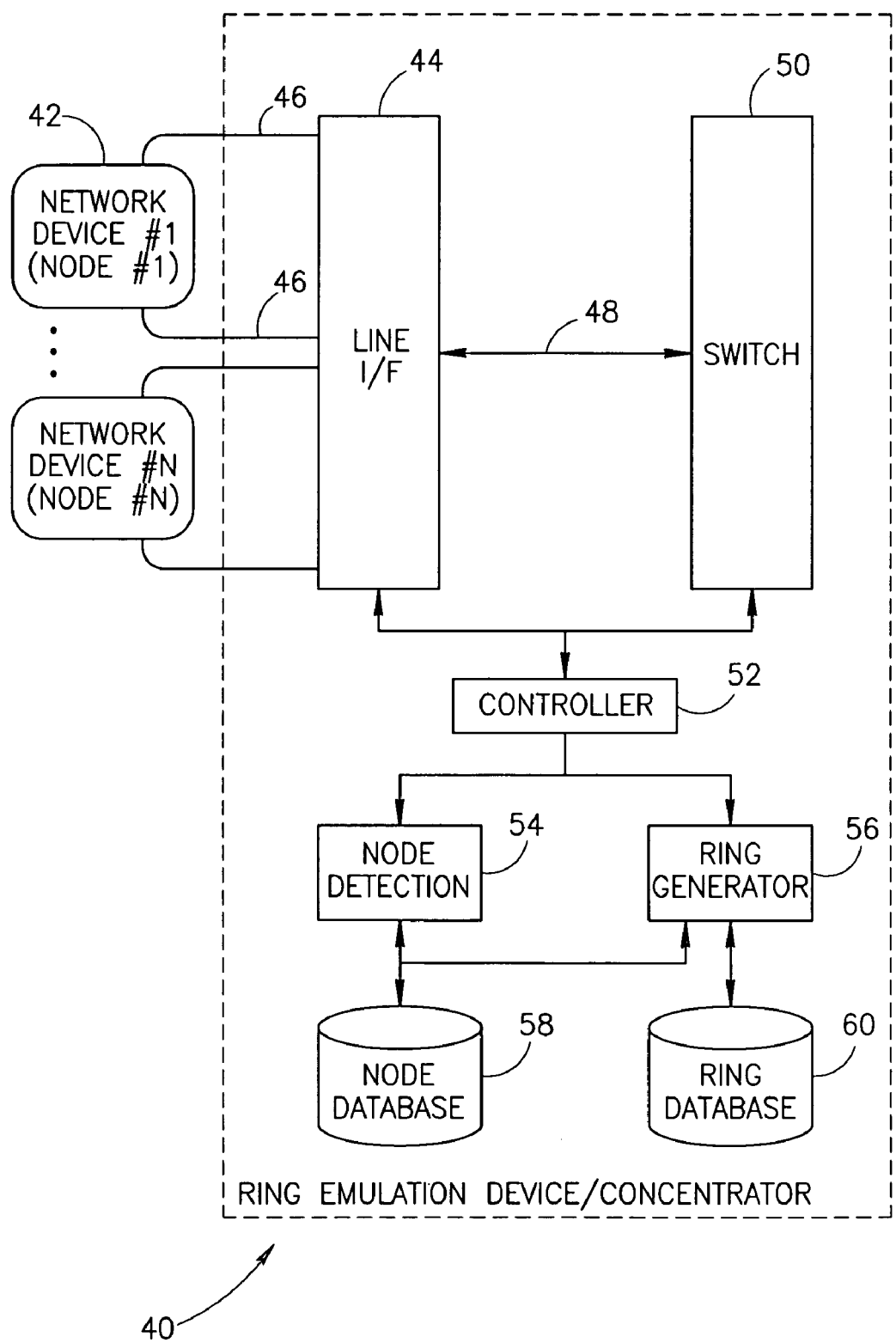
FIG. 4 is a block diagram illustrating a ring emulation device/concentrator adapted to detect a plurality of devices and connect them to form a ring network.

A block diagram illustrating a ring emulation device/concentrator adapted to detect a plurality of devices and connect them to form a ring network is shown in FIG. 4. The concentrator, generally referenced 40, comprises one or more line interface cards 44, one or more switching modules 50 and one or more controllers 52. In addition, a node detection module 54 and ring generator module 56 are adapted to provide node detection and ring formation functions, respectively. The detected nodes are stored in node database 58 while a representation of the ring generated is stored in ring database 60. Note that both the node and ring databases may comprise either transient or persistent databases.

A plurality of network devices 42 is connected to the concentrator via line interface 44. The line interface is adapted to implement the PHY layer used in the particular application, e.g., SONET, SDH, etc. The network devices are connected to the line interface in a star configuration. The switch, suitably instructed by the controller, forwards the data from one device to another as if the devices were connected in a ring configuration.

The line interface comprises a plurality of ports for connection to network devices. Each network device is connected-via two links just as if it were connected within a ring. In accordance with the invention, the network devices may be connected to the line interface without regard to the particular port used. The node detection module is operative to identify and detect the network devices connected. Note that the invention assumes the network devices are adapted to generate and transmit the identification information message having the data content described in connection with FIG. 3. Network devices that do not have such a capability may still be placed in the ring. Data related to the device, however, must be manually configured into the concentrator via a user interface implemented by the controller or other appropriate means.

Node Detection Method

Figure 5:
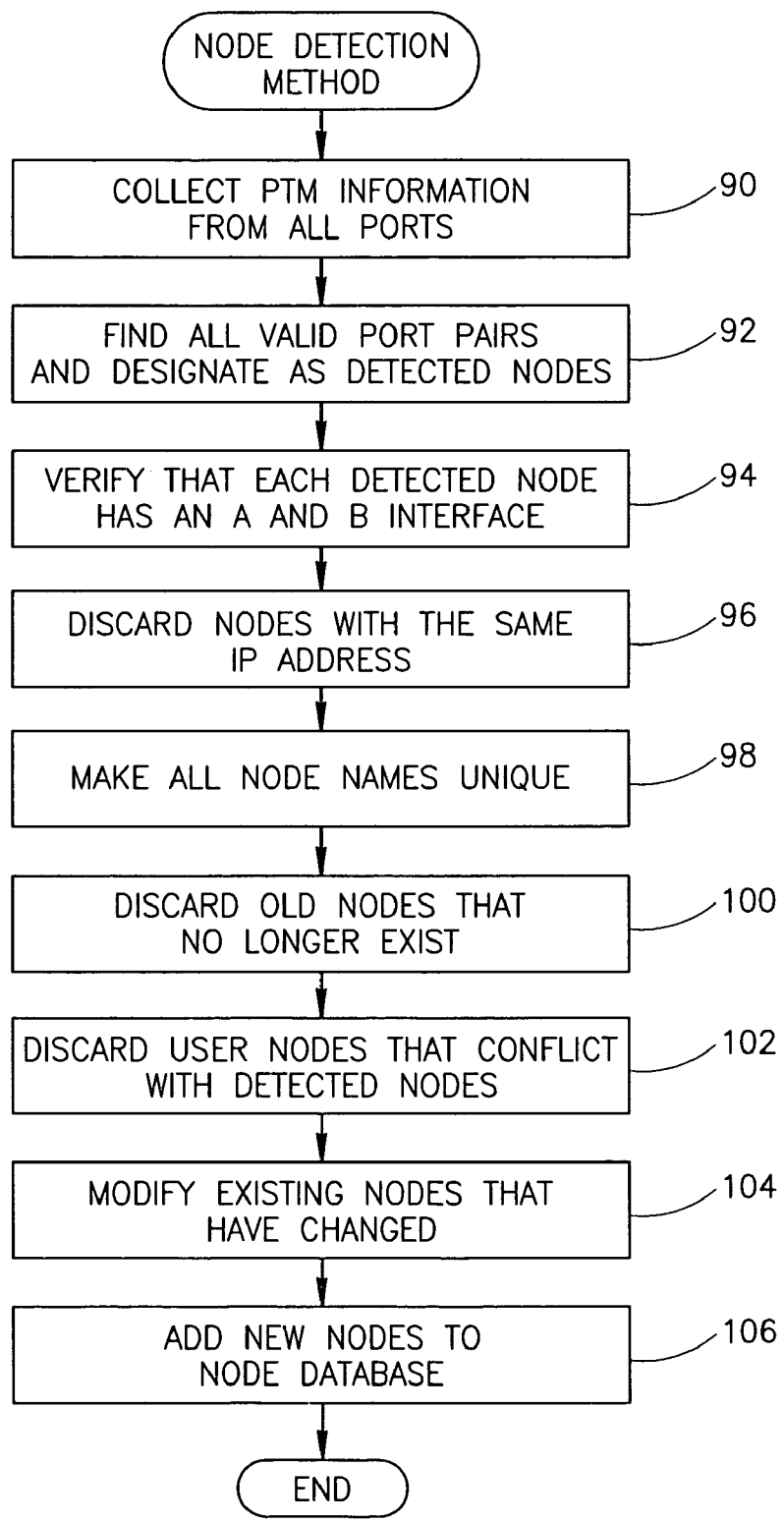
FIG. 5 is a flow diagram illustrating the node detection method of the present invention.

The node detection method of the present invention will now be described in more detail. A flow diagram illustrating the node detection method of the present invention is shown in FIG. 5. First, the identify information messages are collected from all ports (step 90). Note that only ports connected to network devices with the ability to send identification information messages will receive such a message. As described supra, the message may comprise the SONET path trace message, for example.

The information collected is analyzed and a search is performed for all valid port pairs (step 92). Each valid port pair found is designated a detected node. A valid port pair comprises two identification information messages having matching names and IP addresses. Alternatively, the match can be made using only IP addresses. Note that normally for each network device, two messages should be received. It is then verified that each detected node has an A interface and a B interface as specified in the side ID field of the identification information message (step 94).

Nodes with the same IP address are discarded (step 96). If more than one node is found with the same IP address, it means that the user may have intended the device be part of two rings. It is ambiguous which of the nodes is to belong to which ring. Rather than choose randomly, all the nodes associated with the network (i.e. same IP address) are discarded.

The names of the nodes are then made unique (step 98). There may exist different nodes with different IP addresses that were assigned the same name. In such cases, the method detects this and assigns new names to make all the names unique. Nodes that no longer exist are discarded (step 100). Based on the nodes just detected, a search of the node database is performed and nodes found in the node database that were not manually configured by the user and are not in the set of detected nodes are discarded.

Previous manually entered nodes that conflict with newly detected nodes are also discarded (step 102). If a port of a detected node conflicts with a port of a manually entered node, the manually entered node is discarded. Manually entered nodes that do not conflict are assumed to have been entered correctly and are processed as is without any checks performed. Note that in the event a manually entered port is no longer valid, i.e. a network device without the ability to send identification information messages is moved from one port to another, it must be re-entered manually in order to be placed correctly in a ring.

Any nodes previously detected that have changed are modified in the node database (step 104). The existing nodes in the database that have changed are not deleted since additional data may have been stored corresponding to the node, e.g., various configuration data, etc. New nodes are then added to the node database (step 106). An entry with default configuration data is created for each new node added to the node database.

Ring Generation Method

Figure 6:
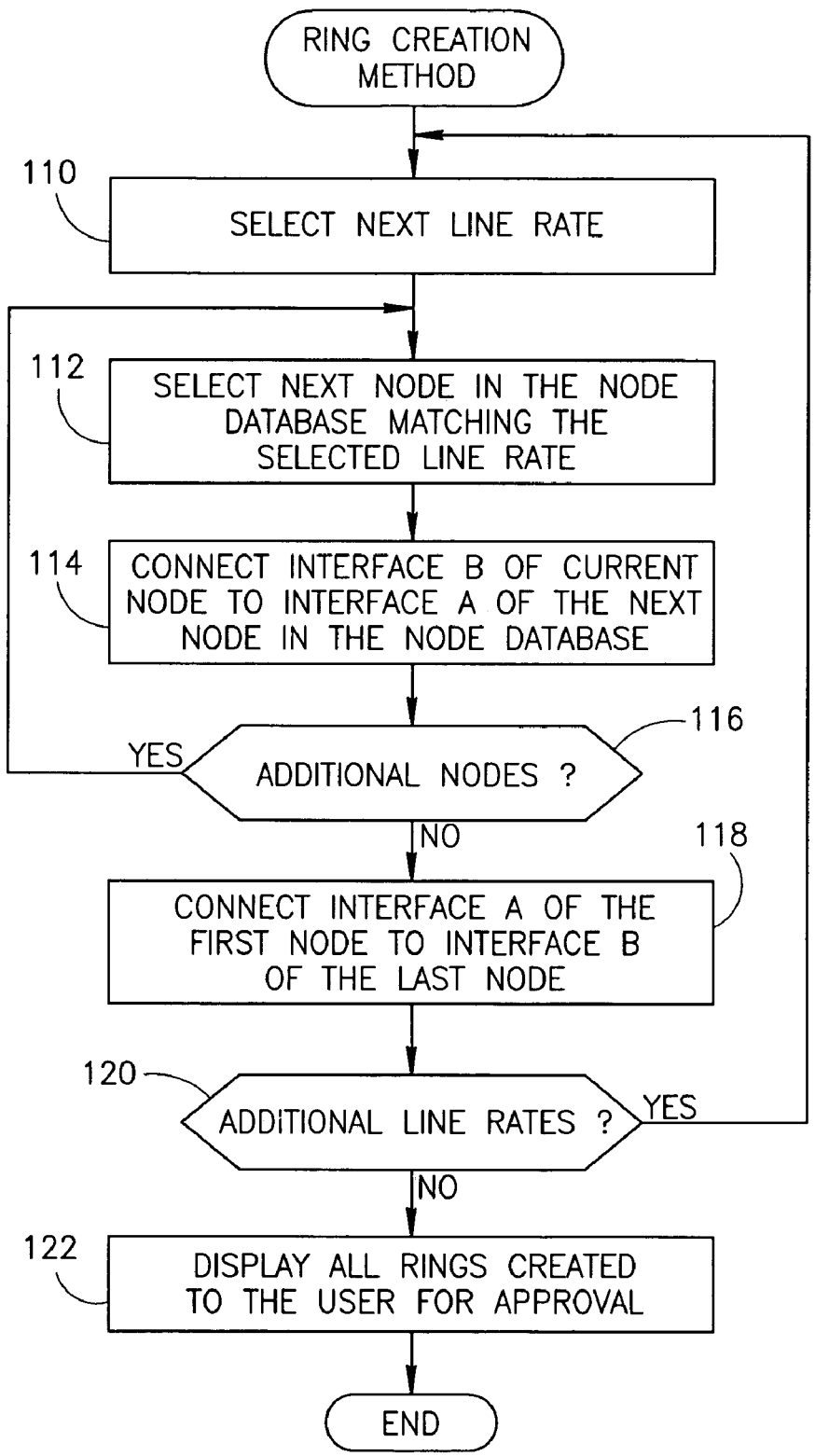
FIG. 6 is a flow diagram illustrating the ring creation method of the present invention.

The ring generation method of the present invention will now be described in more detail. A flow diagram illustrating the ring creation method of the present invention is shown in FIG. 6. In accordance with the invention, the nodes placed in a ring must all have the same line speed. Therefore, if there are nodes in the node database having different line rates, then a separate ring is created for each, e.g., OC-3, OC-12, OC-48, OC-192, etc.

A first line rate is selected (step 110) and the first node in the database is selected matching the selected line rate (step 112). Note that the first line rate selected will typically be the line rate of the first node in the node database. The B interface of the node selected is connected to the A interface of the node next in the node database having the selected line rate (step 114). If there are additional nodes with the selected line rate, the method repeats steps 112, 114 (step 116). Once all the nodes have been processed for the particular line rate, the A interface of the first node selected is connected to the last node selected (step 118). This step closes the ring. Note that the connections made are stored in a ring database 60 (FIG. 4).

If there are additional line rates (step 120) the method continues with step 110. The process described above repeats for each unique line rate until all the nodes have been processed. At this point one or more rings will have been created and their connectivity stored in the ring database. The one or more rings created are then optionally displayed for review and approval by the user (step 122).

Figure 7:
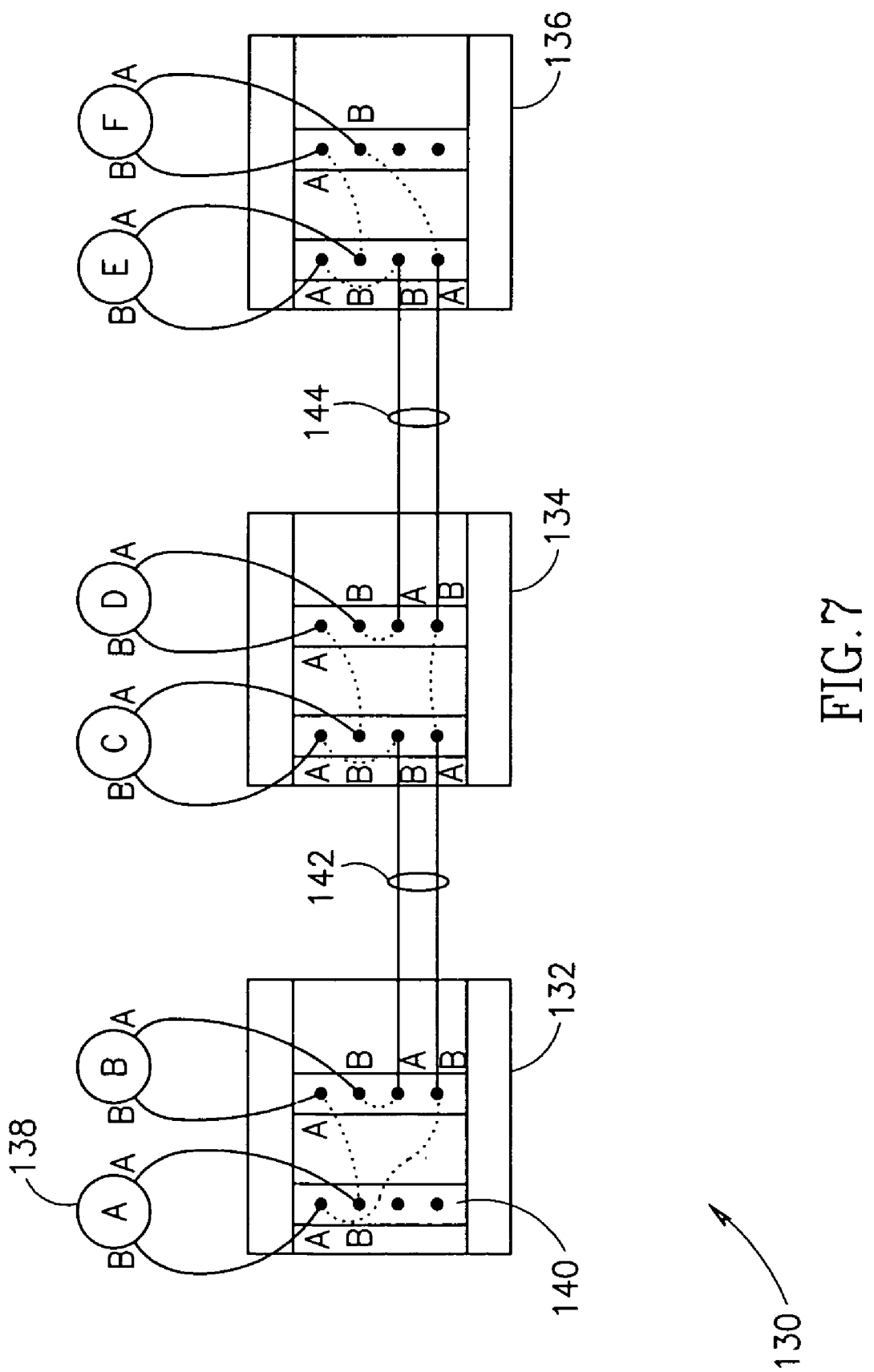
FIG. 7 is a block diagram illustrating the cascading of multiple concentrators adapted to perform the node detection and ring creation method of the present invention.

An advantage of the present invention is that it provides the capability of cascading multiple concentrators without requiring any additional processing. A block diagram illustrating the cascading of multiple concentrators adapted to perform the node detection and ring creation method of the present invention is shown in FIG. 7. The example network, generally referenced 130, comprises three concentrators 132, 134, 136 cascaded together. Network devices 138, labeled A through F are connected to the concentrators: network devices A and B to concentrator 132, network devices C and D to concentrator 134 and network devices E and F to concentrator 136. Each concentrator comprises a plurality of line interface cards 140 with multiple ports each. Each connection and port on both the network devices and concentrators is labeled either A interface or B interface. Concentrators 132, 134 are connected via links 142 while concentrators 134, 136 are connected via links 144.

In operation, the node detection and ring generation methods will be performed first on any one of the three concentrators, e.g., concentrator 132. Since the A and B side IDs are typically fixed on the network devices, the concentrators are adapted to set its side IDs in accordance thereto. Thus, if an A interface is detected, the line interface will set its port to a B interface. As a consequence, the side IDs for the cascade links are determined last. The dotted lines indicate the internal connections made as a result of the node detection and ring generation methods. Thus, the cascade links are seen by each concentrator as simply another network device and they are detected and placed in the ring as if they were regular network devices. For node detection and ring generation purposed, each concentrator does not know that the ports are actually connected to another concentrator.

Note that it is not intended that the scope of the invention be limited to the example presented herein, as networks with any number of cascaded concentrators may be constructed utilizing different methods of cascading.

Note that the node detection method may be implemented with or without the ring generation method. The ring generation method, however, requires the node detection method to be performed beforehand in order to acquire accurate topology information about the network devices connected to the ports of the concentrator. The node detection method may be used alone in cases where it is desired to create one or more rings manually using accurate node information stored in the node database.

In alternative embodiments, the present invention may be applicable to implementations of the invention in integrated circuits or chip sets, e.g., Application Specific Integrated Circuits (ASICs), Field Programmable Gate Arrays (FPGAs), etc., wireless implementations, switching system products and transmission system products, e.g., SONET based products. For the purpose of this document, the term switching systems products shall be taken to mean private branch exchanges (PBXs), central office switching systems that interconnect subscribers, toll/tandem switching centers and broadband core switches located at the center of a service provider's network that may be fed by broadband edge switches or access multiplexers and associated signaling and support system services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Computer Embodiment

Figure 8:
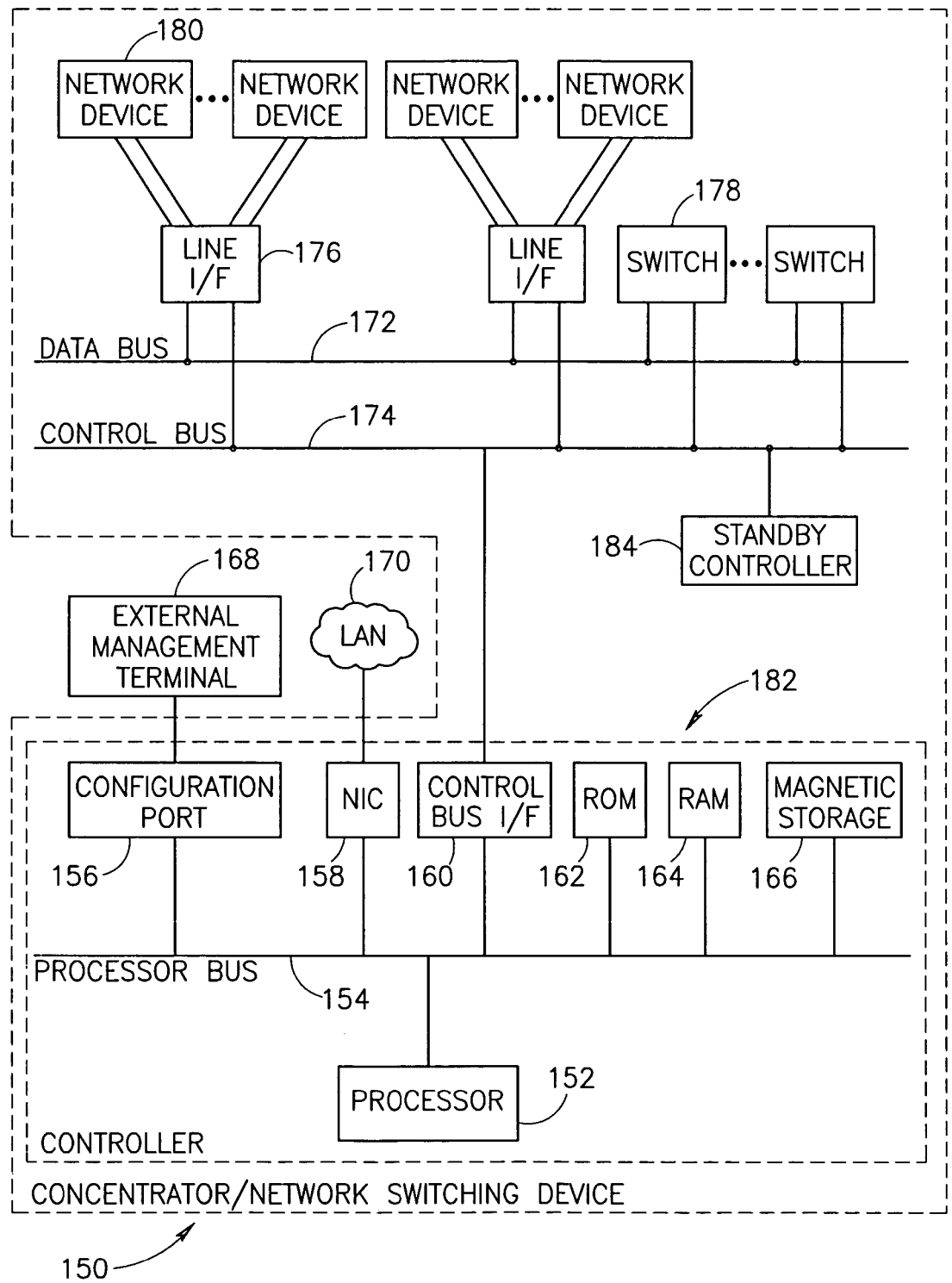
FIG. 8 is a block diagram illustrating an example computer processing system adapted to perform the node detection and ring creation method of the present invention.

In another embodiment, a computer is operative to execute software adapted to perform the node detection and ring configuration method of the present invention. A block diagram illustrating an example computer processing system adapted to perform the node detection and ring configuration method of the present invention is shown in FIG. 8. The system may be incorporated within a network device such as a switch or concentrator, part of which is implemented in software.

The computer system, generally referenced 150, comprises a primary controller 182 and a standby controller 184 coupled to a control bus 174. The controllers are in communication with a number of components including one or more line interface cards 176 and one or more switch cards 178. Each line interface card is connected to a plurality of network devices/nodes 180 via ports on line interface cards over dual links for each network device. The line interface cards provide the PHY layer for the nodes connected to the system. The switching function is provided by the one or more switch cards. The line interface cards and the switch cards both communicate over the control bus 174 and the data bus 172.

The controller 182 comprises a processor 152 which may be implemented as a microcontroller, microprocessor, microcomputer, ASIC core, Field Programmable Gate Array (FPGA), central processing unit (CPU) or digital signal processor (DSP). The controller further comprises static read only memory (ROM) 162, dynamic main memory (RAM) 164 and magnetic memory 166 all in communication with the processor via one or more processor buses 154.

The processor is also in communication via the processor bus with a number of peripheral devices that are also included in the computer system. A configuration port 156 provides access to operation, administration and management features via an external management terminal 168. The terminal communicates with the controller via any suitable means including, for example, serial means such as RS-232, via Ethernet, via the world wide web (WWW) of the Internet, etc. A network interface card (NIC) 158 functions to connect the system to a Local Area Network (LAN) 170 which may also be used for monitoring, i.e. SNMP, etc. and management functions.

The controller may be suitably programmed to implement an optional host interface in addition to the configuration port for communicating with a host computing device in the system. The host may be adapted to configure, control and maintain the operation of the system.

The controller is adapted to implement a user interface via any suitable port such as, for example, the configuration port or NIC port. The user interface is adapted to respond to user inputs and provides feedback and other status information. The user interface may comprise peripheral devices (not shown) that may be optionally added such as a video display, which may comprise a Cathode Ray Tube (CRT) or Liquid Crystal Display (LCD), alphanumeric input device such as a keyboard, a cursor control device (i.e. pointing device) such as a mouse or tablet and a signal generation device such as an audio speaker system.

The magnetic storage device may be adapted to store application programs and data depending on the requirements of the particular implementation. The system comprises computer readable storage medium that may include any suitable memory means including but not limited to magnetic storage, optical storage, semiconductor volatile or non-volatile memory, biological memory devices or any other memory storage device.

The node detection and ring configuration method software is adapted to reside on a computer readable medium, such as a magnetic disk within a disk drive unit. Alternatively, the computer readable medium may comprise a floppy disk, Flash memory card, EEROM, EPROM or EEPROM based memory, bubble memory storage, ROM storage, etc. The software adapted to perform the node detection and ring configuration method of the present invention may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs) and other communication or networking system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of detecting a plurality of network devices connected to a concentrator having a plurality of ports, said method comprising:
    establishing a node database adapted to store node information representing the connectivity of network devices connected to said concentrator;
    receiving identification information on each port connected to a network device;
    matching valid pairs of ports wherein each valid port pair represents a detected node;
    verifying that each detected node comprises an A interface and a B interface connection; and
    adding new detected nodes to said node database.

2. The method according to claim 1, further comprising the step of modifying the names of said detected nodes so as to make all node names unique.

3. The method according to claim 1, further comprising the step of discarding nodes previously entered into said node database that no longer exist.

4. The method according to claim 1, further comprising the step of modifying those nodes already in said node database that have changed.

5. The method according to claim 4, wherein a change comprises a new port for a node already in said node database.

6. The method according to claim 1, further comprising discarding detected nodes that have the same Internet Protocol (IP) address.

7. The method according to claim 1, wherein said identification information comprises network device related information including device name, Internet Protocol (IP) address, interface card ID and side ID.

8. The method according to claim 1, wherein said identification information is transmitted via Synchronous Digital Hierarchy (SDH) J1 path overhead trace bytes.

9. The method according to claim 1, wherein said identification information is transmitted via Synchronous Optical Network (SONET) J1 path overhead trace bytes.

10. The method according to claim 1, wherein a match is declared upon detecting two network devices having the same Internet Protocol (IP) address and name.

11. The method according to claim 1, wherein said node database comprises a plurality of records, each record including a node name field, Internet Protocol (IP) address field, interface ID field, port ID field, line speed field and configuration data field.

12. The method according to claim 1, further comprising the step of connecting the nodes in said node database into a ring by connecting the A interface of one node to the B interface of a node subsequent thereto in said node database.

13. A method of detecting and connecting in ring fashion a plurality of network devices connected to a concentrator having a plurality of ports, said method comprising:
    establishing a node database adapted to store node information representing the connectivity of network devices connected to said concentrator;
    establishing a ring database adapted to store ring information representing the configuration of one or more rings;
    receiving identification information on each port connected to a network device;
    matching valid pairs of ports wherein each valid port pair represents a detected node;
    verifying that each detected node comprises an A interface and a B interface connection;
    adding new detected nodes to said node database;
    connecting the B interface of each node in said node database to the A interface of a node subsequent thereto in said node database; and
    connecting the A interface of a first node in said node database to the B interface of a last node in said node database thus forming a ring.

14. The method according to claim 13, further comprising the step of modifying the names of said detected nodes so as to make all node names unique.

15. The method according to claim 13, further comprising the step of discarding nodes previously entered into said node database that no longer exist.

16. The method according to claim 13, further comprising the step of modifying those nodes already in said node database that have changed.

17. The method according to claim 16, wherein a change comprises a new port for a node already in said node database.

18. The method according to claim 13, further comprising discarding detected nodes that have the same Internet Protocol (IP) address.

19. The method according to claim 13, wherein said identification information comprises network device related information including device name, Internet Protocol (IP) address, interface card ID and side ID.

20. The method according to claim 13, wherein said identification information is transmitted via Synchronous Digital Hierarchy (SDH) J1 path overhead trace bytes.

21. The method according to claim 13, wherein said identification information is transmitted via Synchronous Optical Network (SONET) J1 path overhead trace bytes.

22. The method according to claim 13, wherein a match is declared upon detecting two network devices having the same Internet Protocol (IP) address and name.

23. The method according to claim 13, wherein said node database comprises a plurality of records, each record including a node name field, Internet Protocol (IP) address field, interface ID field, port ID field, line speed field and configuration data field.

24. The method according to claim 13, further comprising the step of displaying the configuration of said ring to a user.

25. The method according to claim 13, further comprising creating additional rings wherein each ring created corresponds to a different line speed.

26. The method according to claim 13, wherein a node is detected via said steps of receiving, matching, verifying and adding.

27. The method according to claim 13, wherein the node information representing the connectivity of a network device is entered manually by a user.

28. An electronic data storage media storing a computer program adapted to program a computer to execute the node detection and ring creation process of claim 13.

29. A concentrator for detecting and connecting in ring fashion a plurality of network devices connected thereto, comprising:
    a plurality of line interface cards, each having a plurality of ports for connection to said network devices;
    a node database adapted to store node information representing the connectivity of network devices connected to said concentrator;
    a ring database adapted to store ring information representing the configuration of one or more rings;
    a node detector operative to:
        receive identification information on each port connected to a network device;
        match valid pairs of ports wherein each valid port pair represents a detected node;
        verify that each detected node comprises an A interface and a B interface connection;
        add new detected nodes to said node database;
    a ring generator operative to:
        connect the B interface of each node in said node database to the A interface of a node subsequent thereto in said node database;
        connect the A interface of a first node in said node database to the B interface of a last node in said node database thus forming a ring; and
    a switch operative to forward data from one node to another in accordance with the configuration of said ring.

30. The concentrator according to claim 29, wherein said line interface cards are adapted to transmit and receive a Synchronous Optical Network (SONET) compatible data stream.

31. The concentrator according to claim 29, wherein said line interface cards are adapted to transmit and receive a Synchronous Digital Hierarchy (SDH) compatible data stream.

32. The method according to claim 29, wherein said identification information is transmitted via Synchronous Digital Hierarchy (SDH) J1 path overhead trace bytes.

33. The method according to claim 29, wherein said identification information is transmitted via Synchronous Optical Network (SONET) J1 path overhead trace bytes.

34. The method according to claim 29, wherein a match is declared upon detecting two network devices having the same Internet Protocol (IP) address and name.

35. The method according to claim 29, wherein said node database comprises a plurality of records, each record including a node name field, Internet Protocol (IP) address field, interface ID field, port ID field, line speed field and configuration data field.

36. A computer readable storage medium having a computer program embodied thereon for causing a suitably programmed system to detect and connect in ring fashion a plurality of network devices connected to a concentrator having a plurality of ports by performing the following steps when such program is executed on said system:

establishing and maintaining a node database adapted to store node information representing the connectivity of network devices connected to said concentrator;

establishing and maintaining a ring database adapted to store ring information representing the configuration of one or more rings;

receiving identification information on each port connected to a network device;

matching valid pairs of ports wherein each valid port pair represents a detected node;

verifying that each detected node comprises an A interface and a B interface connection;

adding new detected nodes to said node database;

connecting the B interface of each node in said node database to the A interface of a node subsequent thereto in said node database; and connecting the A interface of a first node in said node database to the B interface of a last node in said node database thus forming a ring.

37. The computer readable storage medium according to claim 36, wherein said identification information is transmitted via Synchronous Digital Hierarchy (SDH) J1 path overhead trace bytes.

38. The computer readable storage medium according to claim 36, wherein said identification information is transmitted via Synchronous Optical Network (SONET) J1 path overhead trace bytes.

39. The computer readable storage medium according to claim 36, wherein a match is declared upon detecting two network devices having the same Internet Protocol (IP) address and name.

40. The computer readable storage medium according to claim 36, wherein said node database comprises a plurality of records, each record including a node name field, Internet Protocol (IP) address field, interface ID field, port ID field, line speed field and configuration data field.

* * * * *